US010762782B2

(12) United States Patent
Shurkhovetskyy et al.

(10) Patent No.: US 10,762,782 B2
(45) Date of Patent: Sep. 1, 2020

(54) ON-STREET PARKING MAP GENERATION

(71) Applicant: Robert Bosch GmbH, Stuttgart (DE)

(72) Inventors: Georgiy Shurkhovetskyy, Bonn (DE); Carlos Cunha, Mountain View, CA (US); Ruobing Chen, Mountain View, CA (US); Philipp Mayer, Stuttgart (DE); Manuel Maier, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 15/697,097

(22) Filed: Sep. 6, 2017

(65) Prior Publication Data
US 2019/0073901 A1   Mar. 7, 2019

(51) Int. Cl.
*G08G 1/14* (2006.01)
*G01S 17/89* (2020.01)
*G01S 15/931* (2020.01)
*G01S 15/89* (2006.01)
*G01S 13/89* (2006.01)
*G01S 17/931* (2020.01)
*G01S 13/931* (2020.01)

(52) U.S. Cl.
CPC ............. *G08G 1/143* (2013.01); *G08G 1/147* (2013.01); *G01S 13/89* (2013.01); *G01S 15/89* (2013.01); *G01S 17/89* (2013.01); *G01S 17/931* (2020.01); *G01S 2013/9314* (2013.01); *G01S 2013/9316* (2020.01); *G01S 2013/9323* (2020.01); *G01S 2013/9324* (2020.01); *G01S 2015/934* (2013.01); *G01S 2015/935* (2013.01)

(58) Field of Classification Search
CPC ..................................................... G08G 1/143
See application file for complete search history.

(56) References Cited

U.S. PATENT DOCUMENTS

| 8,035,531 B2 * | 10/2011 | Yoshihashi | ........... B60W 50/14 340/932.2 |
| 8,401,235 B2 * | 3/2013 | Lee | ........ G01S 15/025 340/435 |
| 8,487,783 B2 * | 7/2013 | Yoshihashi | ........... B60W 50/14 340/425.5 |

(Continued)

FOREIGN PATENT DOCUMENTS

| DE | 102004062021 A1 | 7/2006 |
| DE | 102008028550 A1 | 12/2009 |

(Continued)

*Primary Examiner* — Bao Long T Nguyen
*Assistant Examiner* — Michael A Berns
(74) *Attorney, Agent, or Firm* — Norton Rose Fulbright US LLP

(57) ABSTRACT

A method includes receiving data corresponding to spaces situated in a street section, the data being ascertained by at least one ascertaining vehicle driving through the street section and including information corresponding to a beginning edge of at least one object and a ending edge of at least one second object, determining boundaries of at least one space in which parking is permitted based on the received data, and generating a display representation of the boundaries of the at least one space in which parking is permitted. The method includes receiving the data and determining the boundaries, for example, each time an ascertaining vehicle drives through the street.

15 Claims, 4 Drawing Sheets

(56) References Cited

U.S. PATENT DOCUMENTS

| | | | | |
|---|---|---|---|---|
| 8,862,321 | B2* | 10/2014 | Moshchuk | B62D 5/0463 |
| | | | | 701/40 |
| 9,361,529 | B2* | 6/2016 | Ryu | G06K 9/00812 |
| 9,747,791 | B2 | 8/2017 | Mayer et al. | |
| 2011/0116717 | A1* | 5/2011 | Lee | G01S 15/025 |
| | | | | 382/199 |

FOREIGN PATENT DOCUMENTS

| | | |
|---|---|---|
| DE | 102009028024 A1 | 2/2011 |
| DE | 102013018721 A1 | 6/2014 |
| DE | 102014009627 A1 | 11/2014 |
| WO | WO2012/019628 A1 | 2/2012 |

\* cited by examiner

ON-STREET PARKING MAP GENERATION

FIELD OF THE INVENTION

The present invention relates to a method for identifying spaces in which parking is permitted. Further aspects of the present invention relate to a computer program, to a central computer facility, and to a device configured to carry out the method. Subject matter of the present application relates to subject matter in U.S. patent application Ser. No. 15/134,194, filed on Apr. 21, 2016 and issued on Aug. 29, 2017 as U.S. Pat. No. 9,747,791, the entire content of which is hereby incorporated by reference herein.

BACKGROUND

Various methods are known in the related art to detect open parking areas for vehicles with the aid of distance based sensors (e.g., ultrasonic sensors, laser sensors, radar sensors, stereo video cameras, etc.). Such methods are known for example from DE 10 2004 062 021 A1, DE 10 2009 028 024 A1, and DE 10 2008 028 550 A1.

A variety of driver assistance systems are used in the automotive field, which are intended to assist the driver with carrying out various driving maneuvers. These include, for example, parking assistance systems which, with the aid of sensors assigned to the vehicle, detect the surroundings, ascertain possible parking spaces in the surroundings, and assist the driver during parking.

A method for reporting a free parking spot for a vehicle is discussed in DE 10 2014 009 627 A1. It is provided to identify free parking spaces with the aid of vehicle-internal sensors and with the aid of attributes such as length, width, height, angle, type, and geographical position. A free parking space is also established when a previously occupied parking spot is cleared. Additionally, further sensors may be used to identify traffic signs, for example to consider pieces of information from signage. Moreover, a linkage to a digital road map is additionally provided to preclude the use of areas which are situated too close to an intersection, for example. Relevant parking spots are reported to other vehicles, with either a direct communication between two vehicles or a central server being used for this purpose.

A method for identifying at least one parking spot for a motor vehicle is discussed in DE 10 2013 018 721 A1. In the method, an occupancy grid is created, into which sensor data of at least one distance-measuring sensor are entered. Based on the sensor data, objects are identified and subsequently classified, for example as a car class and as a non-car class. This makes it possible to identify a gated entrance, for example, since generally no parking automobile is identified in the vicinity of such a gated entrance.

A method for identifying parking spaces based on collected GPS data is discussed in WO 2012/019628 A1. GPS data of a navigation system are superimposed on a digital map, clusters which point to possible parking spaces being displayed. Data on the parking space, such as the type of the parking space or the average parking duration, are extracted from the collected data.

SUMMARY

Example embodiments of the present application provide methods and systems to identify one or more spaces in which parking is permitted.

According to an example embodiment of the present invention, a method for identifying a space in which parking is permitted includes receiving, by processing circuitry, data corresponding to spaces situated in a street section, the data being ascertained by at least one ascertaining vehicle driving through the street section; determining, by the processing circuitry, at least one boundary of at least one space in which parking is permitted based on the received data, the at least one space having at least one of a first boundary and a second boundary; generating, by the processing circuitry, a display representation of the at least one boundary of the at least one space in which parking is permitted; and displaying, by the processing circuitry, a display representation of the at least one boundary of the at least one space in which parking is permitted. In an example embodiment, the received data includes information corresponding to a beginning edge of at least one object and an ending edge of at least one second object, the beginning edge and ending edge being detected by the at least one ascertaining vehicle.

In an example, both a beginning boundary of a space and an ending boundary of a space are determined.

In an example embodiment, the received data includes data from vehicles indicating respective detected objects, corresponding to a respective edge of a parking spot.

In an example embodiment, the receiving the data and the determining the at least one boundary of the at least one space in which parking is permitted are performed each time at least one of the at least one ascertaining vehicle drives through the street section. In an example embodiment, the data is ascertained using distance sensors situated on the at least one ascertaining vehicle.

In an example embodiment, the received data includes: 1) a total number of detected beginning edges; 2) a total number of detected ending edges; and 3) a total number of detected edges for a particular region of the street section.

In an example embodiment, the method further includes determining a boundary variable (R) for the particular region of the street section, where the boundary variable (R) is determined based on $$\frac{(\Sigma \text{Edge}_{end} - \Sigma \text{Edge}_{beginning})}{\Sigma \text{Edge}},$$

$\Sigma \text{Edge}_{end}$ represents a total number of detected ending edges in the particular region of the street section, $\Sigma \text{Edge}_{beginning}$ represents a total number of beginning edges in the particular region of the street section, and $\Sigma \text{Edge}_{region}$ represents a total number of detected edges in the particular region of the street section.

In an example embodiment, the first boundary is determined as a result of R being equal to approximately −1, the second boundary is determined as a result of R being equal to approximately 1, and a region between the first boundary and the second boundary is determined as a result of R being equal to approximately 0.

Due to GPS errors, missing data, and/or occasional illegal parking, for example, the ratio R might not reach 1 precisely, but might only acquire a local peak or trough at the start/end of parking regions. Thus, in an example embodiment, the first and second boundaries are determined as a result of detecting a local peak of R values in a particular region of the street section. In an example embodiment, the first and second boundaries are determined as a result of a statistically significant departure from a local average of the determined R values in a particular region of the street section.

In an example embodiment, the at least one beginning edge is detected as a result of the distance sensors detecting a change in distance corresponding to the ascertaining vehicle moving closer to an object, and the at least one ending edge is detected as a result of the distance sensors detecting a change in distance corresponding to the ascertaining vehicle moving away from an object.

In an example embodiment, the first boundary region is determined as a result of detecting only beginning edges in a particular region of the street section, and the second boundary region is determined as a result of detecting only ending edges in a particular region of the street section.

In an example embodiment, the first boundary region is determined as a result of detecting predominantly beginning edges in a particular region of the street section, and the second boundary region is determined as a result of detecting predominantly ending edges in a particular region of the street section.

Example embodiments of the present invention relate to a server system for identifying at least one space in which parking is permitted, the server system including a database and a processing unit for identifying at least one space in which parking is permitted, where the processing unit is configured to: receive data corresponding to spaces situated in a street section, the data being ascertained by at least one ascertaining vehicle driving through the street section; determine at least one boundary of at least one space in which parking is permitted based on the received data, the at least one space having at least one of a first boundary region and a second boundary region; generate a display representation of the boundaries of the at least one space in which parking is permitted; and provide the display representation on a display device. In an example embodiment, the received data includes information corresponding to a beginning edge of at least one object and an ending edge of at least one second object, the beginning edge and ending edge being detected by the at least one ascertaining vehicle.

Example embodiments of the present invention relate to a non-transitory computer readable medium on which are stored instructions that are executable by a computer processor and that, when executed by the processor, cause the processor to perform a method for identifying at least one space in which parking is permitted, the method including: receiving data corresponding to spaces situated in a street section, the data being ascertained by at least one ascertaining vehicle driving through the street section; determining at least one boundary of at least one space in which parking is permitted based on the received data, the at least one space having at least one of a first boundary and a second boundary; generating a display representation of the at least one boundary of the at least one space in which parking is permitted; and displaying a display representation of the at least one boundary of the at least one space in which parking is permitted. In an example embodiment, the data includes information corresponding to a beginning edge of at least one object and an ending edge of at least one second object, the beginning edge and ending edge being detected by the at least one ascertaining vehicle These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention may encompass other equally effective embodiments.

Any embodiment of any of the disclosed compositions and/or methods can consist of, consist essentially of, comprise, include, contain, and/or have any of the described elements and/or features and/or steps.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features, and advantages of the present invention will become apparent from the following detailed description and the referenced drawings. It should be understood, however, that the detailed description, drawings, and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
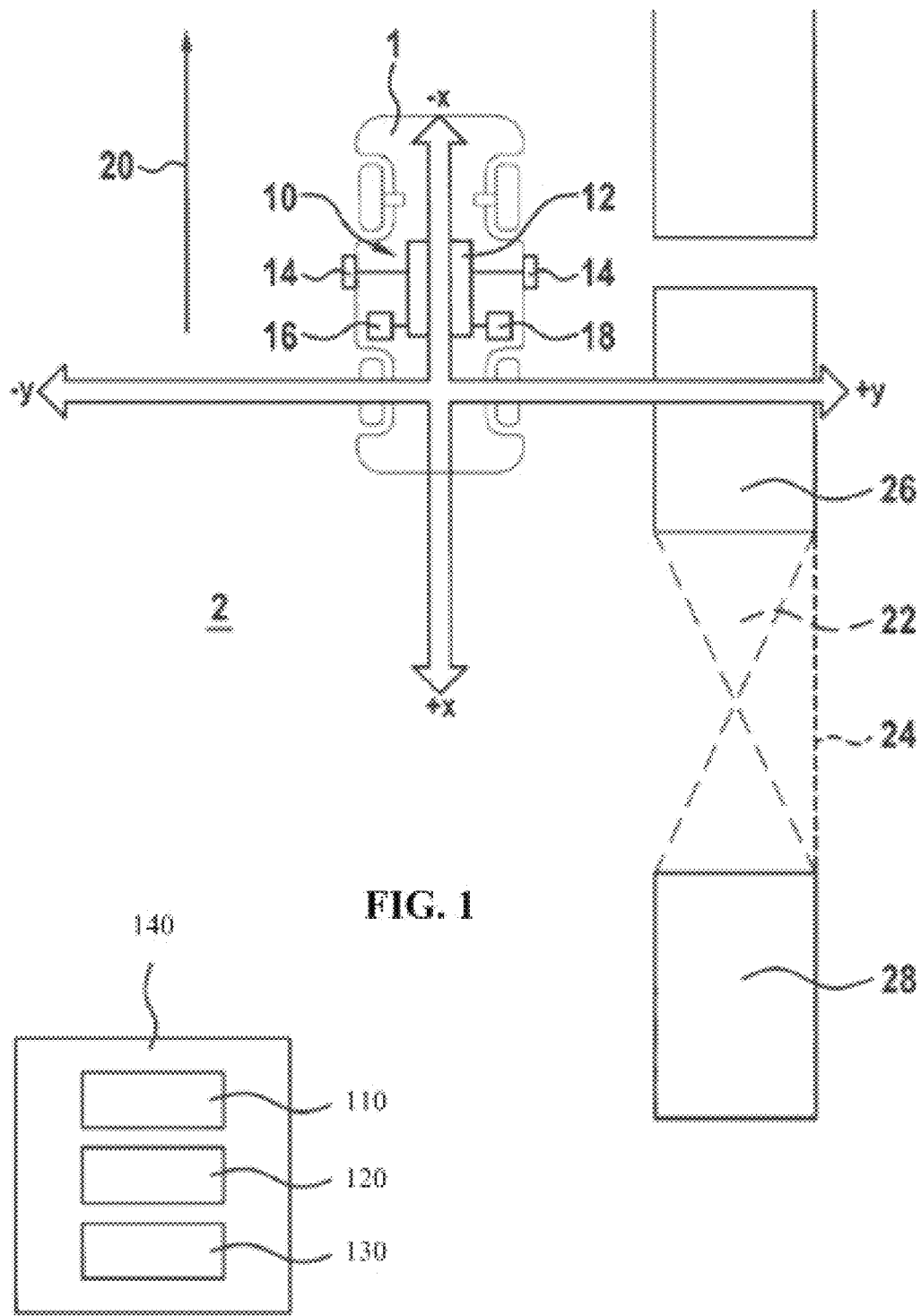
FIG. 1 is a diagram for illustrating o object detection by a vehicle according to an example embodiment of the present invention.

FIG. 1 shows ascertaining vehicle 1 that is moving along street 2 in driving direction 20. Ascertaining vehicle 1, includes, for example, device 10 for assisting the driver, which in turn includes surroundings sensors 14 for detecting possible parking spaces 22 in the surroundings of vehicle 1. Surroundings sensors 14 can be, for example in the specific embodiment illustrated in FIG. 1, distance sensors and are oriented to the sides of vehicle 1, one surroundings sensor 14 each being situated on the left vehicle side and on the right vehicle side. In another example, surroundings sensors can be configured as ultrasonic sensors, laser sensors, radar sensors, or stereo video cameras, etc.

When ascertaining vehicle 1 passes by possible parking space 22, rear delimitation 28, front delimitation 26, and lateral delimitation 24 can be ascertained via surroundings sensors 14. For example, delimitation 28 corresponds to a first reference object, delimitation 26 corresponds to a second reference object, and lateral delimitation 24 corresponds to a lateral reference.

Data corresponding to rear delimitation 28, front delimitation 26, and lateral delimitation 24 can be transmitted together with an indication about its position to a central computer facility 140 via an arrangement for communication 18. The position of possible parking space 22 can be determined in that initially its position relative to vehicle 1 is ascertained, and additionally the position of vehicle 1 can be determined with the aid of satellite navigation. Device 10 can additionally include a GPS receiver 16 for this purpose.

Central computer facility 140 includes an arrangement 110 for communication for communicating with ascertaining vehicles. The information can be stored in a database 120. Furthermore a processing unit 130 can be assigned to central computer facility 140.

Figure 2:
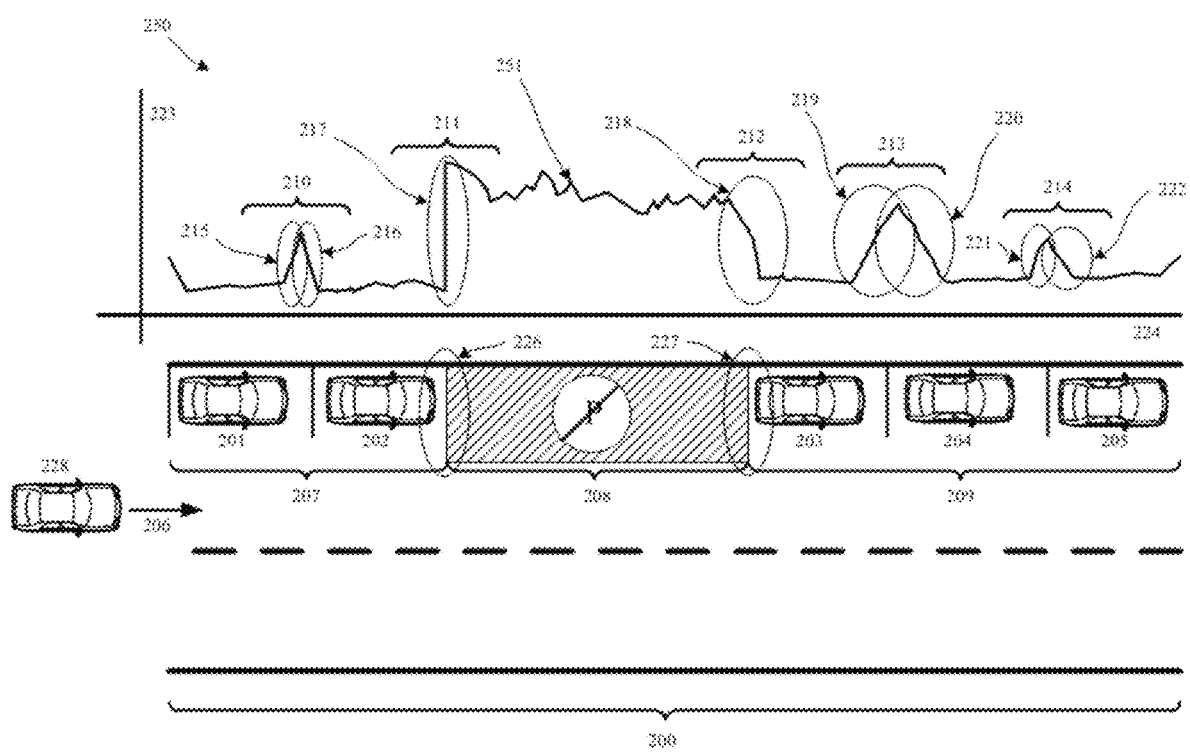
FIG. 2 is a diagram corresponding to a method for identifying a space in which parking is permitted according to an example embodiment of the present invention.

Referring now to FIG. 2, street section 200 is shown with vehicles 201, 202, 203, 204, and 205. Vehicles 201 and 202 are parked in space 207 in which parking is permitted, and vehicles 203-205 are parked in space 209 in which parking is permitted. Street section 200 also includes space 208 in which no parking is allowed. As ascertaining vehicle 228 drives down street section 200 in direction 206, ascertaining vehicle 228 detects, inter alia, the presence of vehicles 201-205 and space 208. Ascertaining vehicle can detect these objects, for example, using a surroundings sensor, which can be, for example, a distance sensor (e.g., ultrasonic sensors, laser sensors, radar sensors, stereo video cameras, etc.). Data collected by ascertaining vehicle 228 corresponding to the detected objects can be collected and transmitted each time ascertaining vehicle 228 drives down street section 200. The collected data can be transmitted to central computer facility 140 shown in FIG. 1.

Also depicted in FIG. 2 is graph 250 that corresponds to the data collected by ascertaining vehicle 228 and includes distance data 223 and positional data 224. Distance data 223 is represented by the vertical axis, and positional data is represented by the horizontal axis. Distance data 223 corresponds to a detected distance between ascertaining vehicle 228 and objects (e.g., vehicles 201-205, space 208, space 207, space 209, etc.) located in street section 200. Positional data 224 includes respective information about the position, of ascertaining vehicle 228 relative to its position on street section 200, at which the respective distance data 223 was collected.

Graphing distance data 223 against corresponding positional data 224 generates plot 251. As is shown in FIG. 2, plot 251 includes various distance changes 215-222. Distance changes 215-222 represent a change in distance detected by ascertaining vehicle 228 and correspond to changes in distance between ascertaining vehicle 228 and objects located in street section 200 as vehicle 228 drives through street section 200. Distance changes 215, 217, 219, and 221 correspond to an increase in distance between ascertaining vehicle 228 and detected objects. On the other hand, distance changes 216, 218, 220, and 222 correspond to a decrease in distance between ascertaining vehicle 228 and detected objects. In other words, as ascertaining vehicle 228 drives through street section 200, ascertaining vehicle 228 can detect if an object is moving farther away from ascertaining vehicle 228 (e.g., distance changes 215, 217, 219, and 221) or if an object is moving closer to ascertaining vehicle 228 (e.g., distance changes 216, 218, 220, and 222). In this example, distance changes 215, 217, 219, and 221 are ending edges of vehicles 201-205, and distance changes 216, 218, 220, and 222 are beginning edges of vehicles 201-205. Additionally, regions 210-214 of street section 200 can also be identified together with the corresponding ending and/or beginning edges that may be positioned within regions 210-214.

Distance data 223, positional data 224, and corresponding ending edges and beginning edges 215-222 can be obtained over a period of time by vehicles traveling through street section 200. In this manner, each time a vehicle travels through a particular street section, a total number of ending edges 215, 217, 219, and 221 of vehicles 201-205 and beginning edges 216, 218, 220, and 222 of vehicles 201-205 are obtained.

In an example embodiment, based on ending edges ending edges 215, 217, 219, and 221; beginning edges 216, 218, 220, and 222; and the total number of ending edges and beginning edges in respective regions 210-214, a boundary variable (R) is determined for each region based on the following:

Boundary Variable $$R = \frac{(\Sigma \text{Edge}_{end} - \Sigma \text{Edge}_{beginning})}{\Sigma \text{Edge}_{region}},$$

where $\Sigma \text{Edge}_{end}$ represents a total number of detected ending edges in the particular region of the street section; $\Sigma \text{Edge}_{beginning}$ represents a total number of beginning edges in the particular region of the street section; and $\Sigma \text{Edge}_{region}$ represents a total number of detected edges in the particular region of the street section. Accordingly, for example, R for region 210 is 0; R for region 211 is 1; R for region 212 is −1; R for region 213 is 0; and R for region 214 is 0. In this manner, an R value of −1 represents first boundary 227 of a space in which parking is permitted; and an R value of 1 represents second boundary 226 of a space in which parking permitted; and an R value of 0 represents a region between a first and a second boundary (e.g., region 210 within space 207 and regions 213-214 within space 209). Using first boundary 227, second boundary 226, and regions 210, 213, and 214 (e.g., the regions that have an R value of 0); a map depicting spaces in which parking is permitted can be generated. In some examples, a predetermined cutoff value is set. In this manner, if a particular region of street section 200 has insufficient data, i.e., if the total number of detected edges is less than the predetermined cutoff value, boundary variable R can be set to zero.

In an example embodiment, using signal processing methods, the first and second boundaries are determined as a result of detecting a local peak of R values in a particular region of the street section. In an example embodiment, the first and second boundaries are determined as a result of a statistically significant departure from a local average of the determined R values in a particular region of the street section.

Based on the foregoing, each time a vehicle (that includes the requisite sensing, calculation, and communication device(s)) drives through a particular street section, boundaries of a space in which parking is permitted can be identified by repeated detections of occupied spaces based on the R values. Thus, over time, each street section can be associated with identified boundaries of one or more spaces in which parking is permitted.

Figure 3:
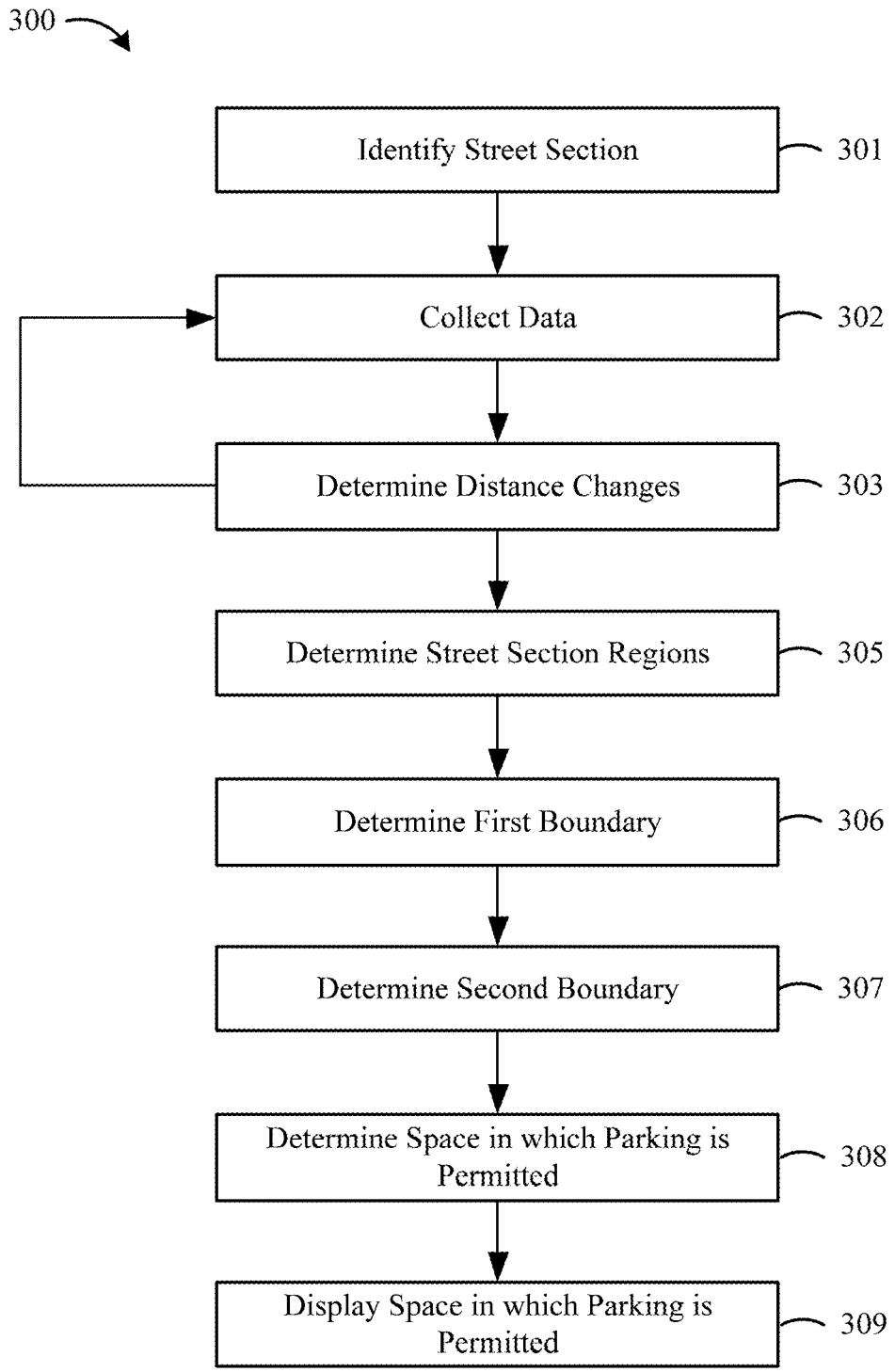
FIG. 3 is a flowchart illustrating a method for predicting parking areas of a street section, according to an example embodiment of the present invention.

FIG. 3 is a flowchart of a method 300 for identifying a space in which parking is permitted, according to an example embodiment.

At step 301, a street section is identified. At step 302, data 130 corresponding to the particular street section is collected over a period of time. The data 130 is collected from various sensors located on vehicles that travel through the street section and can include information related to, inter alia, edges of objects of any obstacles that might be present along a vehicle's travel path through the street section. At step 303, distance changes are determined based on collected data 130.

In an example embodiment, steps 302 and 303 are performed in a loop so that, after completing step 303, method 300 can return to step 302 to collect data 130 for the street section at a different point in time. This loop can continue in parallel to execution of steps 305-309.

Data 130, obtained in 302 of the loop, can be collected from one or more vehicles traveling down the same street section. In this manner, data 130 is collected over a period of time so as to establish a collection of data 130 over the particular period of time corresponding to the particular street section. Furthermore, each time data 130 is collected, corresponding distance changes can be determined. Accordingly, a collection of both data 130 and corresponding distance changes can be determined for a particular street section over a particular period of time.

Figure 4:
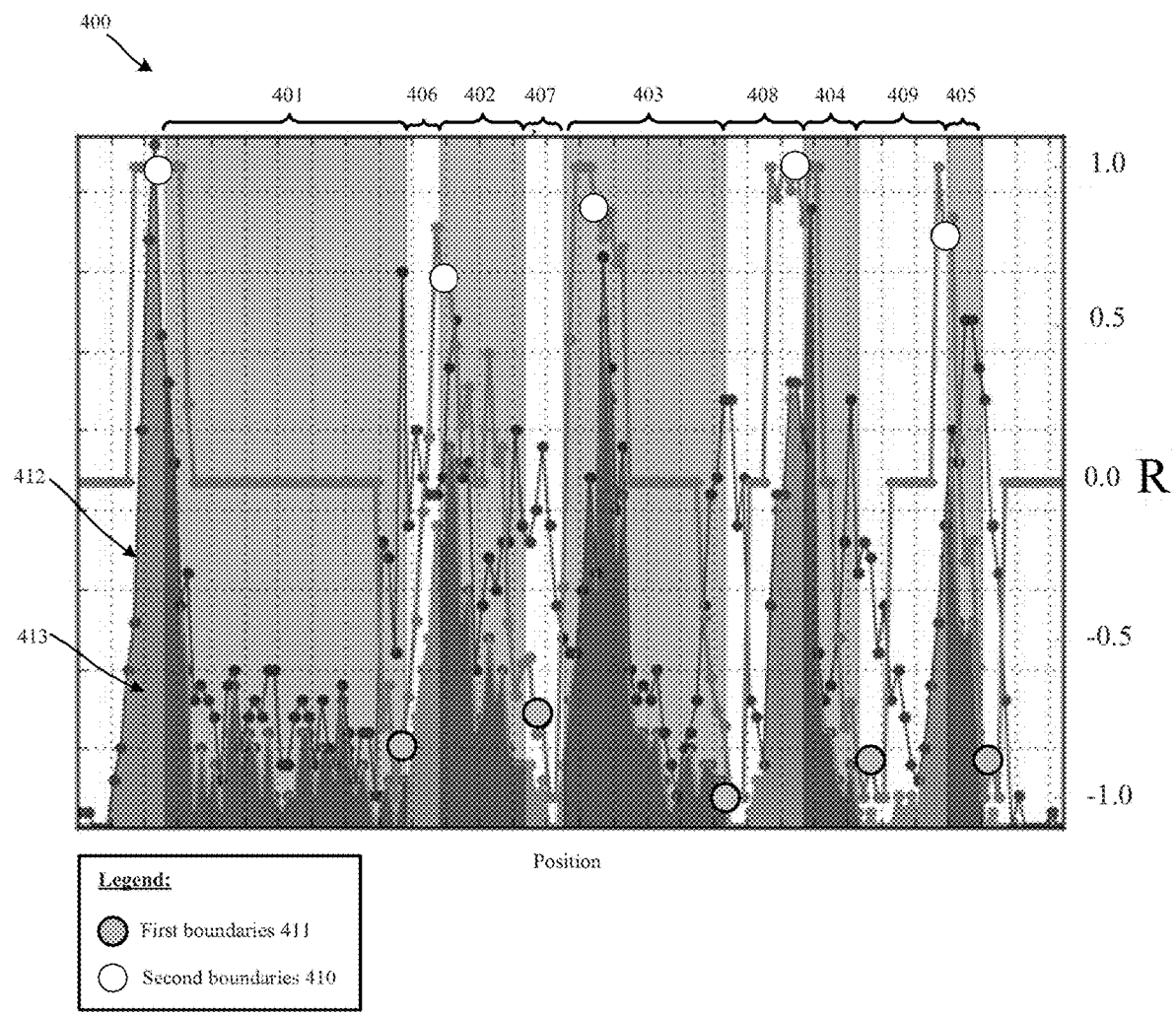
FIG. 4 is a display that displays identified spaces in which parking is permitted, according to an example embodiment of the present invention.

At step 305, street section regions are determined. At step 306, a first boundary is determined based on the collected distance changes. At step 307, a second boundary is determined based on the collected distance changes. At step 308, a space in which parking is permitted is determined using the determined first boundary and second boundary. At step 309, the space in which parking is permitted can be displayed FIG. 4 illustrates an example graphical representation 400 of spaces in which parking is permitted for a particular street section. The vertical axis represents a range of values for boundary variable R, where −1 represents a determination of a first boundary, 0 representing a determination of a region between a first boundary and a second boundary, and 1 represents a determination of a second boundary. The horizontal axis represents positions along the street section. The graph thus represents spaces in which parking is permitted as regions 401-405 and represents spaces in which parking is not permitted as regions 406-409. Plot 412 represents a total number of edges that are detected for the particular street section over a particular time period. Histogram 413 represents the number of detected ending edges for the particular street section. As shown in FIG. 4, second boundaries 410 and first boundaries 411 delimit spaces 401-405 in which parking is permitted.

An example embodiment of the present invention is directed to processing circuitry, e.g., including one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a plurality of ascertaining vehicles that detect, and transmit to a server, information concerning current parking area states along a street section, where the server accumulates the detected parking area states and uses the accumulated data to generate a map of permitted (and illegal or otherwise unavailable) parking areas. The server can transmit the forecasted occupancy estimate to the plurality of ascertaining vehicles, to a user terminal, for example, a desktop, laptop, hand-held device, Personal Digital Assistant (PDA), television set-top Internet appliance, mobile telephone, smart phone, etc., to an additional server, and/or to additional vehicles. The ascertaining vehicle, user terminal, other vehicles or server can then display the map using a display device.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

What is claimed is:

1. A method comprising:
   determining, by processing circuitry and based on received data that (a) correspond to spaces in a street section and (b) include information corresponding to a beginning edge of at least one object and an ending edge of at least one second object, at least one of a first boundary and a second boundary of a space in which parking is permitted; and
   generating, by the processing circuitry, a display representation of the at least one of the first boundary and the second boundary of the space in which parking is permitted;
   wherein:
      the received data are ascertained using sensors situated on at least one ascertaining vehicle driving through the street section;
      the received data includes:
         1) a total number of detected beginning edges for a particular region of the street section;
         2) a total number of detected ending edges for the particular region; and
         3) a total number of detected edges for the particular region;
      the determining of the at least one of the first boundary and the second boundary includes determining, for the particular region of the street section, a boundary variable (R) as $$\frac{(\Sigma\text{Edge}_{end} - \Sigma\text{Edge}_{beginning})}{\Sigma\text{Edge}_{region}};$$

$\Sigma$ Edge$_{end}$ represents the total number of detected ending edges in the particular region of the street section;

$\Sigma$ Edge$_{beginning}$ represents the total number of detected beginning edges in the particular region of the street section; and $\Sigma$ Edge$_{region}$ represents the total number of detected edges in the particular region of the street section.

2. The method of claim 1, wherein the receipt of the received data and the determining of the at least one of the first boundary and the second boundary is performed each time at least one of the at least one ascertaining vehicle drives through the street section.

3. The method of claim 1, wherein the sensors are distance sensors.

4. The method of claim 3, wherein the beginning edge of the at least one object is detected as a result of the distance sensors detecting a change in distance corresponding to a decrease in object distance from the at least one ascertaining vehicle.

5. The method of claim 3, wherein the ending edge of the at least one second object is detected as a result of the distance sensors detecting an increase in object distance from the at least one ascertaining vehicle.

6. The method of claim 1, wherein the first boundary is determined as a result of R being equal to approximately −1.

7. The method of claim 1, wherein the second boundary is determined as a result of R being equal to approximately 1.

8. The method of claim 1, wherein a region between the first boundary and the second boundary is determined as a result of R being equal to approximately 0.

9. The method of claim 1, wherein the first boundary is determined as a result of R being equal to approximately −1, the second boundary is determined as a result of R being equal to approximately 1, and a region between the first boundary and the second boundary is determined as a result of R being equal to approximately 0.

10. A system comprising:
    a data store;
    a communication interface; and
    a processing unit;
    wherein:
       the processing unit is configured to perform the following:
          based on data that (a) are received via the communication interface from at least one ascertaining vehicle, (b) correspond to spaces in a street section, and (c) include information corresponding to a beginning edge of at least one object and an ending edge of at least one second object, determine at least one of a first boundary and a second boundary of a space in which parking is permitted; and
          generate a display representation of the boundaries of the space in which parking is permitted;
       the received data includes:
          1) a total number of detected beginning edges for a particular region of the street section;
          2) a total number of detected ending edges for the particular region; and
          3) a total number of detected edges for the particular region;
       the received data are ascertained using sensors situated on the at least one ascertaining vehicle driving through the street section;
       the determining of the at least one of the first boundary and the second boundary includes determining, for the particular region of the street section, a boundary variable (R) as $$\frac{(\Sigma\text{Edge}_{end} - \Sigma\text{Edge}_{beginning})}{\Sigma\text{Edge}_{region}};$$

$\Sigma$ Edge$_{end}$ represents the total number of detected ending edges in the particular region of the street section;

$\Sigma$ Edge$_{beginning}$ represents the total number of beginning edges in the particular region of the street section; and $\Sigma$ Edge$_{region}$ represents the total number of detected edges in the particular region of the street section.

11. The server system of claim 10, wherein the processing unit is configured for receiving the received data and to perform the determination of the at least one of the first boundary and the second boundary is performed each time a vehicle drives through the street section.

12. The server system of claim 10, wherein the sensors are distance sensors.

13. The server system of claim 12, wherein the beginning edge of the at least one object is detected as a result of the distance sensors detecting a change in distance corresponding to a decrease in object distance from the ascertaining vehicle, and the ending edge is detected as a result of the distance sensors detecting an increase in object distance from the ascertaining vehicle.

14. The server system of claim 10, wherein the first boundary is determined as a result of R being equal to approximately −1, the second boundary is determined as a result of R being equal to approximately 1, and a region between the first boundary and the second boundary is determined as a result of R being equal to approximately 0.

15. A non-transitory computer-readable medium on which are stored instructions that are executable by a computer processor and that, when executed by the processor, cause the processor to perform a method, the method comprising:
 determining at least one of a first boundary and a second boundary of a space in which parking is permitted based on received data that (a) correspond to spaces in a street section and (b) include information corresponding to a beginning edge of at least one object and an ending edge of at least one second object; and
 generating a display representation of the at least one of the first boundary and the second boundary of the space in which parking is permitted;
 wherein:
  the received data includes:
   1) a total number of detected beginning edges for a particular region of the street section;
   2) a total number of detected ending edges for the particular region; and
   3) a total number of detected edges for the particular region;
  the received data are ascertained using sensors situated on at least one ascertaining vehicle driving through the street section;
  the determining of the at least one of the first boundary and the second boundary includes determining, for the particular region of the street section, a boundary variable (R) as $$\frac{(\Sigma \text{Edge}_{end} - \Sigma \text{Edge}_{beginning})}{\Sigma \text{Edge}_{region}};$$

$\Sigma \text{Edge}_{end}$ represents the total number of detected ending edges in the particular region of the street section;
  $\Sigma \text{Edge}_{beginning}$ represents the total number of beginning edges in the particular region of the street section; and
  $\Sigma \text{Edge}_{region}$ represents the total number of detected edges in the particular region of the street section.

* * * * *